United States Patent
Arunapuram et al.

(10) Patent No.: US 10,007,889 B2
(45) Date of Patent: Jun. 26, 2018

(54) FINDING MINIMUM COST TRANSPORTATION ROUTES FOR ORDERS THROUGH A TRANSPORTATION NETWORK

(71) Applicant: Oracle International Corporation, Redwood Shores, CA (US)

(72) Inventors: Sundararajan Arunapuram, West Chester, PA (US); Thomas Kaeppel Payne Tsukada, Ardmore, PA (US); Albert Charles Drummond, Jr., Yardley, PA (US); Yun Wang, Lansdale, PA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1038 days.

(21) Appl. No.: 14/107,814

(22) Filed: Dec. 16, 2013

(65) Prior Publication Data

US 2014/0180958 A1    Jun. 26, 2014

Related U.S. Application Data

(60) Provisional application No. 61/740,444, filed on Dec. 20, 2012, provisional application No. 61/785,756, filed on Mar. 14, 2013.

(51) Int. Cl.
*G06Q 40/00* (2012.01)
*G06Q 10/08* (2012.01)
*G06Q 10/04* (2012.01)

(52) U.S. Cl.
CPC ..... *G06Q 10/08355* (2013.01); *G06Q 10/047* (2013.01)

(58) Field of Classification Search
CPC .................................................. G06Q 40/00
(Continued)

(56) References Cited

U.S. PATENT DOCUMENTS 7,278,568 B2    10/2007    Kadaba
8,275,676 B2    9/2012     Roberts et al.
(Continued)

FOREIGN PATENT DOCUMENTS

EP    1086754 A2    3/2001
EP    1909221 A1    4/2008
(Continued)

OTHER PUBLICATIONS

Non-final Office Action dated Jun. 17, 2016 for related U.S. Appl. No. 14/107,865.
(Continued)

*Primary Examiner* — Kirsten Apple
(74) *Attorney, Agent, or Firm* — Vista IP Law Group, LLP

(57) ABSTRACT

A method, system, and computer program product for enterprise software application modules for order consolidation management. The method commences by receiving a set of orders where individual orders have one or more order constraints, then mapping the orders onto one or more transportation legs, where the individual transportation legs have leg constraints. A set of feasible paths through the legs for the orders is generated and ranked based on a total cost through the legs to pick-up an order from a source location and deliver it to a destination location. The method continues by determining a set of shortest paths through a transportation network for the set of orders, wherein the determination of any one of the shortest paths is made subject to honoring respective order constraints while concurrently (Continued)

honoring the leg constraints. The orders are then remapped onto one of the shortest paths.

20 Claims, 10 Drawing Sheets

(58) Field of Classification Search
USPC .......................................................... 705/35
See application file for complete search history.

(56) References Cited

U.S. PATENT DOCUMENTS

| | | | |
|---|---|---|---|
| 8,386,397 | B1 | 2/2013 | Agarwal et al. |
| 8,554,702 | B2 | 10/2013 | Arunapuram |
| 2002/0019759 | A1 | 2/2002 | Arunapuram et al. |
| 2002/0049622 | A1* | 4/2002 | Lettich ................. G06Q 10/063 705/7.11 |
| 2002/0065738 | A1* | 5/2002 | Riggs ................ G06Q 10/0631 705/334 |
| 2002/0069210 | A1* | 6/2002 | Navani .................. G06Q 10/06 |
| 2002/0082893 | A1 | 6/2002 | Barts et al. |
| 2003/0050810 | A1 | 3/2003 | Larkin |
| 2004/0199664 | A1* | 10/2004 | Feldman ................. H04L 45/02 709/238 |
| 2005/0197876 | A1* | 9/2005 | Benda .................... G06Q 10/04 705/333 |
| 2005/0246192 | A1 | 11/2005 | Jauffred et al. |
| 2007/0214026 | A1* | 9/2007 | Cheng .............. G06Q 10/06316 705/7.26 |
| 2008/0046302 | A1 | 2/2008 | Cartwright |
| 2008/0065262 | A1 | 3/2008 | Gottlieb |
| 2009/0030770 | A1 | 1/2009 | Hersh |
| 2009/0037234 | A1 | 2/2009 | Gabrielson |
| 2009/0055232 | A1 | 2/2009 | Bruno et al. |
| 2009/0301038 | A1 | 12/2009 | Gabrielsen et al. |
| 2010/0049537 | A1 | 2/2010 | Erie |
| 2012/0226624 | A1* | 9/2012 | Song .................... G06Q 10/083 705/338 |
| 2013/0096973 | A1* | 4/2013 | LaVoie ............. G06Q 10/06315 705/7.22 |
| 2013/0159208 | A1* | 6/2013 | Song ...................... G06Q 10/08 705/338 |
| 2013/0317929 | A1* | 11/2013 | Schnorf ................. G06Q 10/08 705/26.3 |
| 2013/0339076 | A1* | 12/2013 | Baranda ................. G06Q 10/08 705/7.17 |
| 2014/0019288 | A1* | 1/2014 | Bossinakis ....... G06Q 10/06315 705/26.4 |
| 2014/0172576 | A1* | 6/2014 | Spears ............... G06Q 30/0266 705/14.63 |
| 2015/0008733 | A1 | 1/2015 | Periot |
| 2016/0042321 | A1* | 2/2016 | Held .................. G06Q 10/0838 705/338 |
| 2016/0189066 | A1* | 6/2016 | Liao ....................... G06Q 10/06 705/6 |

FOREIGN PATENT DOCUMENTS

| | | |
|---|---|---|
| EP | 2109072 A1 | 10/2009 |
| WO | WO 2005090171 A1 | 9/2005 |
| WO | WO 2008137083 | 11/2008 |
| WO | WO 2011072253 | 6/2011 |

OTHER PUBLICATIONS

Final Office Action dated Sep. 9, 2016 for related U.S. Appl. No. 14/107,603.
Ortec, "Solution: Pallet and Load Building", Date Accessed: Dec. 13, 2012, 4 pages, url: http://www.ortec.com/solutions/pallet_and_load_building.aspx.
Logen Solutions, Co., "Truck, Container and Pallet Loading Software", Mar. 11, 2012, 2 pages.
IBM, "Transportation Planning and Optimization", Mar. 23, 2012, 2 pages.
JDA, "Transporation & Logistics Management" JDA Software: Synchronizing Supply Chain Execution with Complete Visibility into Inventory, Costs, and Performance, Brochure, Jun. 5, 2012, 16 pages.
SAP Library—Transportation Planning/Vehicle Scheduling (TP/VS)) "Optimization", May 5, 2012, 1 page.
John G. Klincewicz, Operations Research, "Solving a Freight Transport Problem Using Facility Location Techniques", Jan./Feb. 1990, vol. 38 No. 1, 1 page.
G.G. Brown, et al., "Consolidation of Customer Orders into Truckloads at a large Manufacturer", The Journal of the Operational Research Society, vol. 48, Issue 8, Aug. 1997, 9 pages.
RedPrairie "COPLEX Routing Optimization" Apr. 3, 2009, 2 pages.
RedPrairie "Driving Out Costs and Increasing Customer Service Through Advanced Transportation Management" 2009, 12 pages.
RedPrairie, "Pallet & Load Optimization", Apr. 6, 2009, 2 pages.
Non-Final Office Action dated Mar. 11, 2016 for related U.S. Appl. No. 14/107,603.
Non-final Office Action dated Feb. 24, 2017 for related U.S. Appl. No. 14/107,698.
Non-final Office Action dated Feb. 24, 2017 for related U.S. Appl. No. 14/107,761.
Non-final Office Action dated Apr. 20, 2017 for related U.S. Appl. No. 14/107,603.
Final Office Action dated Jun. 20, 2017 for related U.S. Appl. No. 14/107,698.
Final Office Action dated Jun. 20, 2017 for related U.S. Appl. No. 14/107,761.
Notice of Allowance dated Jan. 23, 2018 for related U.S. Appl. No. 14/107,698.
Notice of Allowance dated Jan. 29, 2018 for related U.S. Appl. No. 14/107,761.

* cited by examiner

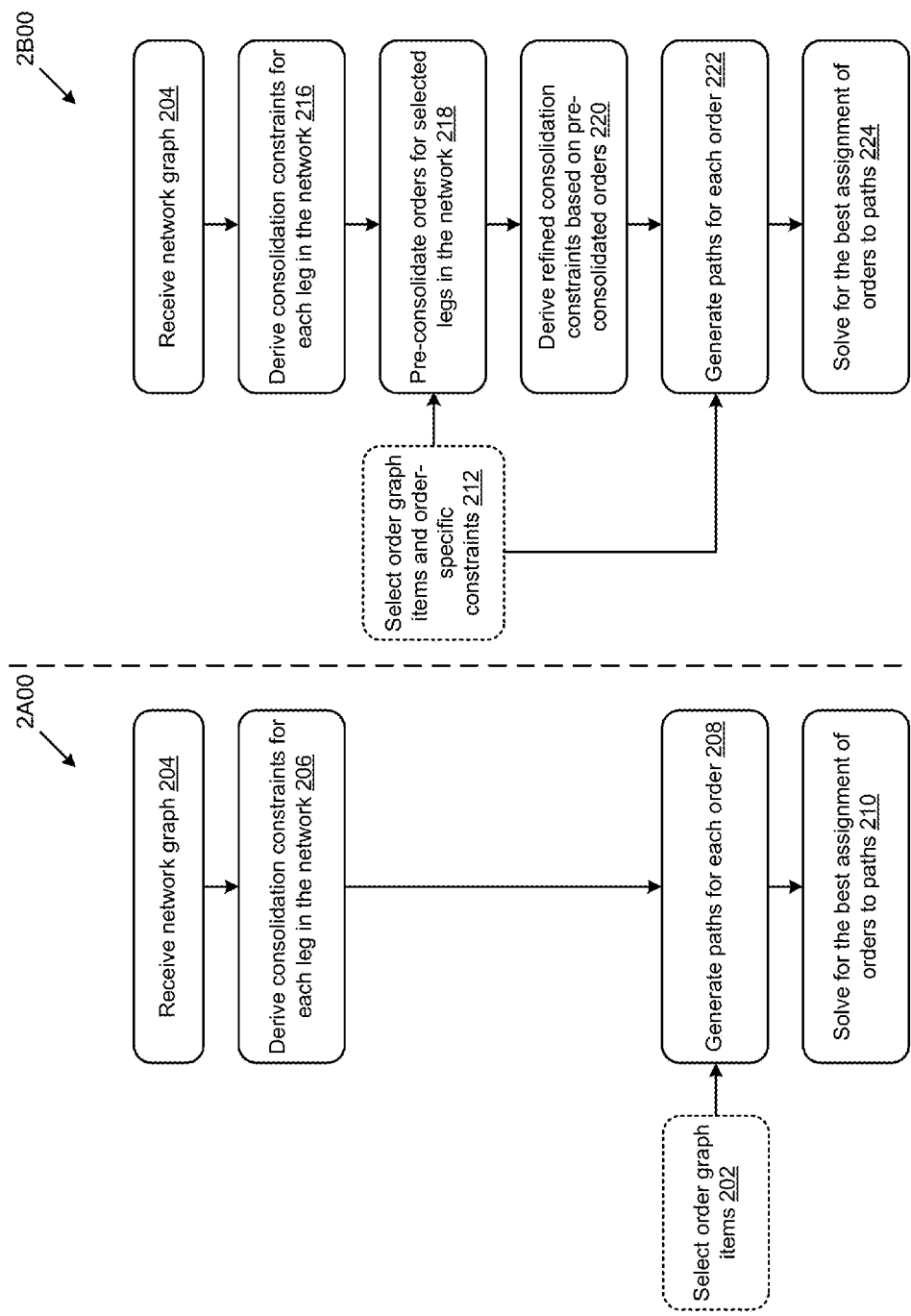

FIG. 5

Multi-mode Transportation Network Optimizer Entry Form

| Sequence Number | Leg Name | Primary | Network ID | Rate Offering ID | Rate Record ID |
| --- | --- | --- | --- | --- | --- |

| Hazmat Region ID | Intermediary Corporation ID | | | | |

| Create Single Shipment | Payment Method Code ID | Auto Consolidation Type | | Cross Dock Location ID | Equipment Assignment Type (Optimize Equipment) |

| Via Source Location ID | Via Source Profile ID | Via Dest Location ID | | Via Dest Profile ID | Trans-shipment |

| Hold as late as possible? | Carrier Capacity | | Carrier Commitments? | Trans-shipment — 510 |

| Number "k" | | | | | |

FINDING MINIMUM COST TRANSPORTATION ROUTES FOR ORDERS THROUGH A TRANSPORTATION NETWORK

RELATED APPLICATIONS

The present application claims the benefit of priority to U.S. Patent Application Ser. No. 61/740,444, entitled "SYSTEMS METHODS AND APPARATUS FOR CONSTRUCTING A MULTI-TIER ROUTING AND SHIPPING PLAN", filed Dec. 20, 2012; and the present application claims the benefit of priority to U.S. Patent Application Ser. No. 61/785,756, entitled "SYSTEMS METHODS AND APPARATUS FOR CONSTRUCTING A MULTI-TIER ROUTING AND SHIPPING PLAN", filed Mar. 14, 2013, both of which are hereby incorporated by reference in their entirety.

The present application is related to co-pending U.S. patent application Ser. No. 14/107,865, entitled "A CARRIER CAPACITY AWARE MULTI-STOP SHIPMENT GENERATOR", filed on even date herewith, which is hereby incorporated by reference in its entirety; and the present application is related to co-pending U.S. patent application Ser. No. 14/107,603, entitled "CONCURRENT DETERMINATION OF SHIPPING MODE AND SHIP UNIT PACKING DURING TRANSPORTATION PLANNING", filed on even date herewith, which is hereby incorporated by reference in its entirety; and the present application is related to co-pending U.S. patent application Ser. No. 14/107,698, entitled "COST AND LATENCY REDUCTIONS THROUGH DYNAMIC UPDATES OF ORDER MOVEMENT THROUGH A TRANSPORTATION NETWORK", filed on even date herewith, which is hereby incorporated by reference in its entirety; and the present application is related to co-pending U.S. patent application Ser. No. 14/107,761, entitled "COST AND LATENCY REDUCTIONS THROUGH DYNAMIC UPDATES OF ORDER MOVEMENT THROUGH A TRANSPORTATION NETWORK", filed on even date herewith, which is hereby incorporated by reference in its entirety.

Certain aspects in some embodiments of the present application are related to material disclosed in U.S. patent application Ser. No. 13/111,120, entitled "FRAMEWORK FOR OPTIMIZED PACKING OF ITEMS INTO A CONTAINER" filed on May 19, 2011, the content of which is incorporated by reference in its entirety in this Application.

FIELD

The disclosure relates to the field of enterprise software application modules for order management and shipping/transportation management and more particularly to techniques for finding minimum cost transportation routes by using refined consolidation constraints.

BACKGROUND

The transportation of goods from point of origin to a destination plays an important role in the world economy, and often goods must be moved through a complex network of carriers. In the context of global commerce, delivery of an order to a destination from the point of manufacture or packaging to a final destination, the order may traverse various legs comprising (for example) an overland segment (e.g., by truck), a segment across an ocean (e.g., by seagoing vessel), possibly an air segment (e.g., by aircraft), and in some cases even additional segments (e.g., additional overland segments). Some order management systems propose routing for orders, and techniques for such routing may account for shipment using as many legs as may be needed to route from a source location to a destination location. Some systems attempt to account for practical considerations (e.g., timing of delivery) as well as efficiency considerations (e.g., aggregate cost incurred by traversing all legs of an itinerary), yet these legacy techniques still fall short.

Some legacy techniques are able to identify a shortest path from a source to a destination for a particular order (for example a large order), and then find other orders with the same source and destination regions so as to consolidate those orders into one shipment along the identified shortest path. Unfortunately, such legacy techniques fail to consider order consolidation constraints that are inherent in the order data rather than the transportation network itself. For example, legacy techniques may consolidate orders based upon the geography of order locations within the network, without considering whether order pickup time windows or other order pickup-level constraints allow this combination to be feasible. For another example, legacy techniques may consolidate orders based upon capacities defined in the transportation network (e.g., the capacities of the types of trucks available in the network), without considering whether the characteristics of the size or contents of the order or orders satisfy sufficient capacity loading constraints to allow this combination to be feasible.

Legacy techniques are rife with such artificially or falsely simplified constraints. Further legacy techniques that rely on shortest path routing fail to consider refined consolidation constraints derived from pre-consolidation of orders based on order-specific data when considering the consolidation of orders. What is needed is a technique or techniques for deriving refined consolidation constraints in orders before attempting to find minimum cost transportation routes for orders through a transportation network.

None of the aforementioned legacy techniques have the capabilities to perform the herein-disclosed techniques for finding minimum cost transportation routes by using refined consolidation constraints. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for finding minimum cost transportation routes by using refined consolidation constraints.

The problem of finding lower cost transportation routes can be solved by refining consolidation constraints before consolidating orders. A method for refining order consolidation constraints before consolidating orders commences upon receiving a set of orders, the orders having constraints with respect to how it may be combined with other orders. Additional order consolidation constraints can be derived from these order-level constraints. Processing continues by using these refined consolidation constraints to determine a set of shortest paths through a transportation network for the set of orders and mapping at least some of the individual ones of the set of orders to a selected one of the shortest paths.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 2A is a flow chart of a shortest path algorithm using late-stage order consolidation.

FIG. 2B is a flow chart of a lowest cost path algorithm as used in systems for finding minimum cost transportation routes for orders, according to some embodiments.

FIG. 5 is a sample screen device for entering multi-mode transportation network optimizer characteristics, according to some embodiments.

DETAILED DESCRIPTION

Figure 1A:
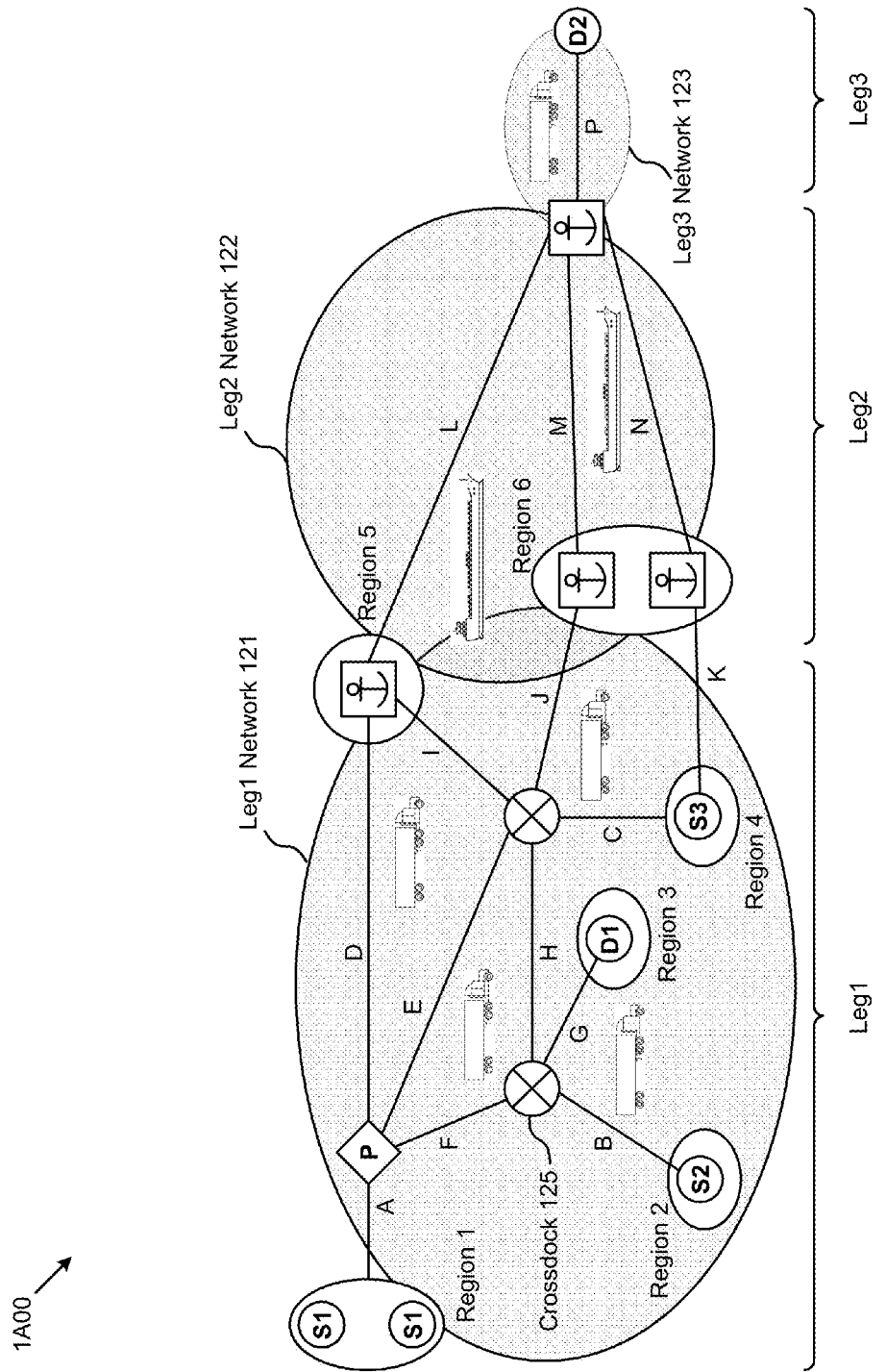
FIG. 1A is a schematic representation of a multi-mode transportation network as used by systems for finding minimum cost transportation routes, according to some embodiments.

Some embodiments of the present disclosure address the problem of managing shipments of goods over multi-mode transportation routes and some embodiments are directed to an improved approach for implementing finding minimum cost transportation routes by using refined consolidation constraints.

Overview

Some order management systems propose routing for orders, and techniques for such routing may account for shortest route shipment using only as many legs as may be needed to route from a source location to a destination location. Some systems attempt to account for and/or optimize for practical considerations (e.g., timing of delivery) as well as efficiency considerations (e.g., aggregate cost incurred by traversing all legs of an itinerary). Yet what is needed is a technique or techniques for deriving refined order consolidation constraints from order-level constraints by grouping or pre-consolidating orders to achieve the effect of more accurately modeling the costs of paths to be considered during optimization.

As an example, consider multiple orders from nearby but not identical sources to identical destinations—one order from LA to Boston, another from San Diego to Boston, and a third from San Francisco to Boston. The capacity of the type of available equipment for transporting orders from California to Boston may accommodate all three orders. The available capacity is a consolidation constraint inherent in the network. Simplistic assumptions based only on this network-level consolidation constraint may result in a conclusion that all three orders can actually go on the same shipment. However, the use of an algorithm for solving the sequencing of multiple pickup stops on a multi-stop shipment may provide information that at most two of the orders may go on the same shipment, perhaps based on the combination of pickup and delivery time windows on the orders. From this result it can be derived that a refined consolidation constraint requiring that only two of these three orders can go on the same shipment, thus allowing for a more accurate determination of the cost of a routing solution.

For another example, multiple orders share a common source location and a common destination location. The capacity of the type of available equipment for transporting orders from the source to the destination may accommodate three such orders. Simplistic assumptions based only on this network-level consolidation constraint may result in a conclusion that all three orders can actually go on the same shipment. However, the use of an algorithm for solving the packing configuration of orders onto this type of equipment may provide information that at most two of the orders may go on the same piece of equipment, perhaps because there is only enough room to accommodate the orders if they are stacked one upon another, and the order-level constraints forbid this kind of stacking. From this result it can be understood that a refined consolidation constraint is needed, namely a constraint requiring that only two of these three orders can go on the same shipment.

Routing can be described using itineraries, and itineraries can be single leg or multi-leg. Moreover, carriers that provide movement of goods often coordinate among themselves to create a transportation network. Strictly as examples, transportation networks can support multiple itineraries, and the carriers within a transportation network can service one or more legs within a given itinerary. Itineraries can come in various forms:

Multi-leg itineraries where each order is transported on each leg using only one carrier. An example is a three leg land-ocean-land itinerary, where the first land leg represents shipping directly from the order source to the departure port, the ocean leg is oceangoing, and the last land leg represents movement of goods from the arrival port to the order destination.

Itineraries including a crossdock.

A multi-leg itinerary where throughpoints can be used on one or more of the legs. An example is a three leg land-ocean-land itinerary, where the first land leg goes through a crossdock so that an order can be on two shipments on that leg, one from the order source to the crossdock, and another from the crossdock to the departure port.

A single-leg itinerary where more than one crossdock is present. Such a single-leg itinerary may also include consolidation pools or deconsolidation pools.

A single-leg itinerary where a network of throughpoints is defined. All possible routes from the starting point of the leg to the ending point of the leg can be determined from a network, and a route can be defined as a series of traversals through a sequence of throughpoints. A series of traversals through a sequence of throughpoints can be considered to be a network of throughpoints.

A multi-leg itinerary where one or more of the legs traverses a network of throughpoints.

As exemplified herein, a leg of an itinerary can have any number of constraints associated with the leg. For example, a leg constraint can refer to specific source and destination locations as well as to specific via points. A leg constraint can limit use of the leg to a specific carrier or a set of carriers, a leg constraint can include an association to a particular transportation network, a leg constraint can describe a departure date and an arrival date, a leg constraint can include one or more specifications of compatible equipment, one or more types of rates, etc.

Still further, consolidation can become complicated by various constraints pertaining to the orders themselves. To illustrate further some order constraints and consolidation complexities, various consolidation constraints might be applicable to the individual constituents and/or mix of a multi-commodity order. For example, milk cannot be shipped in the same overseas container as fertilizer (though both could be shipped on the same oceangoing vessel). Order constraints can comprise any number of time constraints, consolidation constraints, packing constraints, or any other constraint pertaining to the packing, consolidation and transportation and delivery of the order and/or its constituent components. There may also be constraints on the orders pertaining to the locations for pickup and receiving. Further, constraints pertaining to the locations for pickup and receiving may also include timing and calendar constraints.

In exemplary cases, an order constraint is considered with respect to acts of consolidation and routing. An order constraint can derive from characteristics of the contents of a or constituent of the order (e.g., the order includes a container to be refrigerated throughout transport, such as milk), or an order constraint can derive from characteristics pertaining to the mixture or combination of the contents of the order (e.g., milk cannot be transported together with hazardous waste, etc.). An order may be constrained to use a particular carrier, a particular type of equipment, a particular rate, a particular itinerary, and/or a particular routing constraint (e.g., a "must traverse" constraint or a "must avoid" constraint), etc.

Pertaining to some embodiments, the terms in Table 2 are presented merely to be illustrative of the descriptions herein.

TABLE 1

Sample terms and sample uses

| Term | Sample Usage |
| --- | --- |
| Throughpoint | A throughpoint is an intermediate location such as a crossdock or a pool. A throughpoint is defined as a location and a location role. |
| Itinerary leg | If a leg has a leg type of "ITINERARY LEG", it can be part of an itinerary, but it cannot be part of a routing network. |
| Network leg | If a leg has a leg type of "NETWORK LEG", it can be part of a routing network, but not one of the legs on an itinerary. A network leg specifies both a source and destination. The source/destination can be either a region or a throughpoint (combination of location and location role). |
| Routing network | An itinerary leg can have a routing network, which is a set of network legs that represent the transportation network between the itinerary leg source and its destination. |
| Parent order movement | A parent order movement is an order movement on an itinerary leg with a routing network. (The parent order movement might not yet have child order movements if it has not yet been routed through the routing network.) |
| Child order movement | A child order movement is an order movement on a network leg. (A child order movement should always have a parent.) |
| Ordinary order movement | An ordinary order movement is an order movement on an itinerary leg with no routing network. |
| Representative location | A region can have a representative location. Typically, the representative location should be some location contained in the region that can stand in for all the other locations in the region. This allows the region to be treated like a location for the cases of distance and transit time calculations and rating. |

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is a schematic representation of a multi-mode transportation network 1A00 as used by systems for finding minimum cost transportation routes. As an option, the present transportation network 1A00 may be implemented in the context of the architecture and functionality of the embodiments described herein. Also, the transportation network 1A00 or any aspect therein may be implemented in any desired environment.

As shown, the multi-mode transportation network 1A00 comprises three legs; Leg1, Leg2, and Leg3. Leg1 is an overland leg, Leg2 is an overseas leg, and Leg3 is another overland leg. Within each leg is a network of carriers capable of transporting goods from point to point over the shown segments. The overland Leg1 comprises a network of carriers (e.g., network 121), the overseas leg, Leg2, comprises carriers (e.g., network 122), and Leg3 comprises a network of carriers (e.g., network 123). Now, consider a shipment from source point S1 to destination point D2. As shown, the shortest path is from S1 through segments A, D, L, and P to reach destination point D2. Also consider a shipment from source point S2 to destination point D2. The shortest path is from S2 to crossdock 125 over segment B and through to destination point D2 through segments H, J, M, and P to arrive at destination point D2. Now observe that both orders (e.g., the order originating at source point S1 and the order originating source point S2) both must traverse Leg2 in order to arrive for a final overland segment P, thus both orders could be carried in a single container over Leg2. However, absent the use of the herein-disclosed techniques, the individual shipments might have been routed (less efficiently) for shipment according to their respective shortest paths.

A system is needed for generating possible paths through the network for each order, and an algorithm for generating possible paths before optimization. Such a system is discussed in the following FIG. 1B.

Figure 1B:
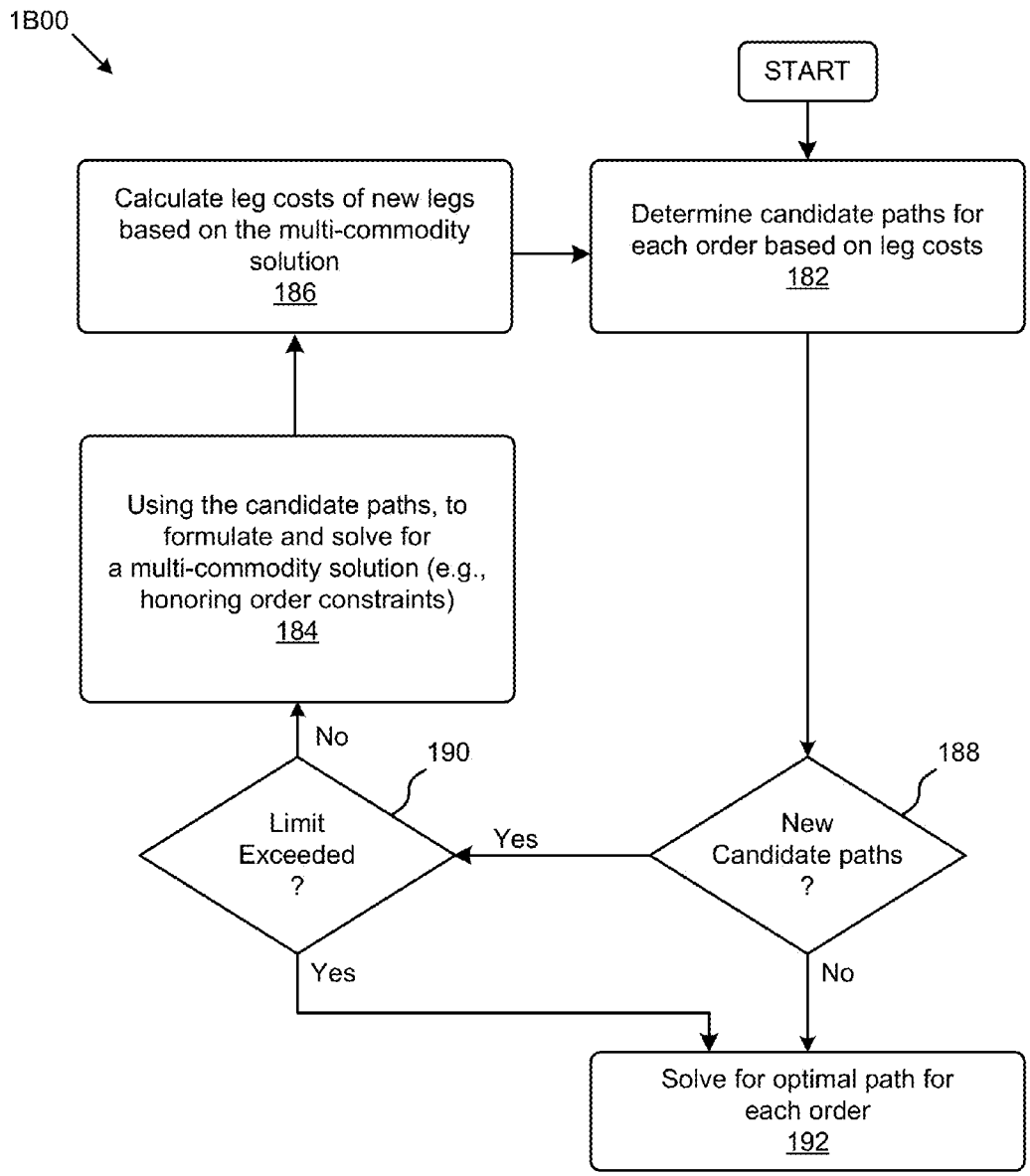
FIG. 1B is a flow chart of a sample path generation algorithm as used in systems for finding minimum cost transportation routes for orders, according to some embodiments.

FIG. 1B is a flow chart of a sample path-generation algorithm 1B00 as used in systems for finding minimum cost transportation routes for orders. As an option, the present sample path generation algorithm 1B00 may be implemented in the context of the architecture and functionality of the embodiments described herein. Also, the sample path-generation algorithm 1B00 or any aspect therein may be implemented in any desired environment.

The shown flow chart implements an exemplary path-generation algorithm, also termed a multi-tier algorithm. The multi-tier algorithm involves finding optimal routes in a network for a set of given orders. An order in this context can represent a single order, a compound order (e.g., an order bundle), or a pallet or other collection of goods that flows through the transportation network. The network can be described as a set of itineraries which is input to the path-generation algorithm 1B00.

The algorithm commences to determine a set of candidate paths such as k-lowest cost paths or k-shortest paths for each order (see operation 182). The number "k" can be a user-definable parameter, possibly using a graphical interface (e.g., see FIG. 5). A candidate path is one that costs the least, from among given alternatives, the cost being derived from the sum of the costs associated with each leg option on the path. A candidate path is generated to satisfy all of the order constraints on the order(s) and/or its consolidation, as well as satisfying the leg constraints of the chosen leg options of the path. For example, a leg option might represent a specific voyage that departs on Monday, May 23, 2011 and arrives one week later at the destination port the following Monday, May 30, 2011. For a particular order to use this voyage, the order must arrive at the port of loading in time for it to make the voyage and should have enough time from the port of discharge to deliver at the final destination before expiration of any timing-related order constraints. The lead times can be considered in calculating adherence to timing constraints.

A as illustrated in FIG. 1B, the path problem is solved to determine candidate paths for each order based on leg costs (see operation 182). If new paths are discovered (see decision 188) and if a limit on a number of new paths has not been exceeded, or if a computing limit has not been exceeded (see decision 190), then the algorithm formulates and solves a multi-commodity flow problem using the already determined candidate paths (see operation 184). The costs on the legs are then calculated based upon the multi-commodity flow solution (see operation 186). The algorithm then loops back to operation 182 to use these newly calculated leg costs in solving a new path problem for each order. If in decision 188 no new paths are discovered, or if in decision 190 the computing limit has been exceeded, processing proceeds to a network solver, which solves for an optimal path for each order, subject to a set of constraints (see operation 192). As shown, a candidate path is evaluated subject to honoring respective order constraints while also honoring the leg constraints. A formal language treatment of the formulation of the optimization problem solved in operation 192 is presented farther below (see FIG. 3 and FIG. 4).

FIG. 2A is a flow chart of an algorithm 2A00 using late-stage order consolidation. As shown, the system of FIG. 2A commences upon receipt of a network graph representing the transportation network (see operation 204). The system determines the consolidation constraints based upon the constraints data inherent in the network graph, including constraints data for each leg regarding geography, cost, service time, and equipment capacity (see operation 206). Using order graph item data (see operation 202 to provide a selection of a set of order graph items, each representing order-specific data for an order) and using the consolidation constraints (see aforementioned operation 206), the system generates paths for each order through the network (see operation 208). The system then determines the best set of assignments from each order to one of its possible paths (see operation 210). In the embodiment of FIG. 2A, the consolidation constraints are derived from the network graph constraints—not from consolidation constraints that are based on the order-specific data. This technique can be improved upon by using consolidation constraints that are based on the order-specific data that emerges when pre-consolidating the orders. Such a technique is discussed as pertains to the following FIG. 2B.

FIG. 2B is a flow chart of a lowest cost path algorithm 2B00 as used in systems for finding minimum cost transportation routes for orders. As an option, the present lowest cost path algorithm 2B00 may be implemented in the context of the architecture and functionality of the embodiments described herein. Also, the lowest cost path algorithm 2B00 or any aspect therein may be implemented in any desired environment.

FIG. 2B distinguishes over FIG. 2A in at least the following aspects:
Rather than using only consolidation constraints based upon network graph leg constraints (as in operation 206 of FIG. 2A), the refined consolidation constraints lowest cost path algorithm 2B00 uses both order-specific data (see operation 212) as well as network graph leg constraints data (see operation 204) in order to derive consolidation constraints (see operation 216) ahead of operations to pre-consolidate orders for selected legs in the network (see operation 218).

Using the results of the pre-consolidation operation, the system derives refined consolidation constraints based upon how orders were consolidated in the pre-consolidation operation (see operation 220).

Operation 218 serves to codify refined consolidation constraints using order-specific constraints. For example, a consolidation operation that makes use of algorithms for solving the sequencing of pickup and delivery stops on a multi-stop shipment may be used to determine that a subset of the orders can feasibly be consolidated onto the same shipment at a certain cost and service time, while another subset of the orders cannot feasibly be consolidated onto the same shipment. A set of refined consolidation constraints thus derived will reflect the costs and service times of such a feasible multi-stop shipment. As another example, a consolidation operation that makes use of algorithms for solving the loading configuration of orders onto a particular type of equipment may be used to determine that a subset of orders can feasibly be loaded onto the same shipment using the particular type of equipment, while another subset of the orders cannot feasibly be loaded onto the same shipment using that particular type of equipment. A set of refined consolidation constraints thus derived will reflect that costs and service times of such a feasibly loaded shipment.

The step to generate paths for each order (see operation 222) is based in part on the refined consolidation constraints from pre-consolidation (see operation 218). As compared with operation 208 of FIG. 2A, this operation 222 of FIG. 2B may result in a different set of paths for each order given the cost and service time constraints derived from the pre-consolidation of one particular order with respect to other orders.

The operation to solve for and select the best assignment of orders to paths (see operation 224) includes inputs in the form of variables that are used in an optimization (e.g., used as a variable in an objective function).

Figure 3:
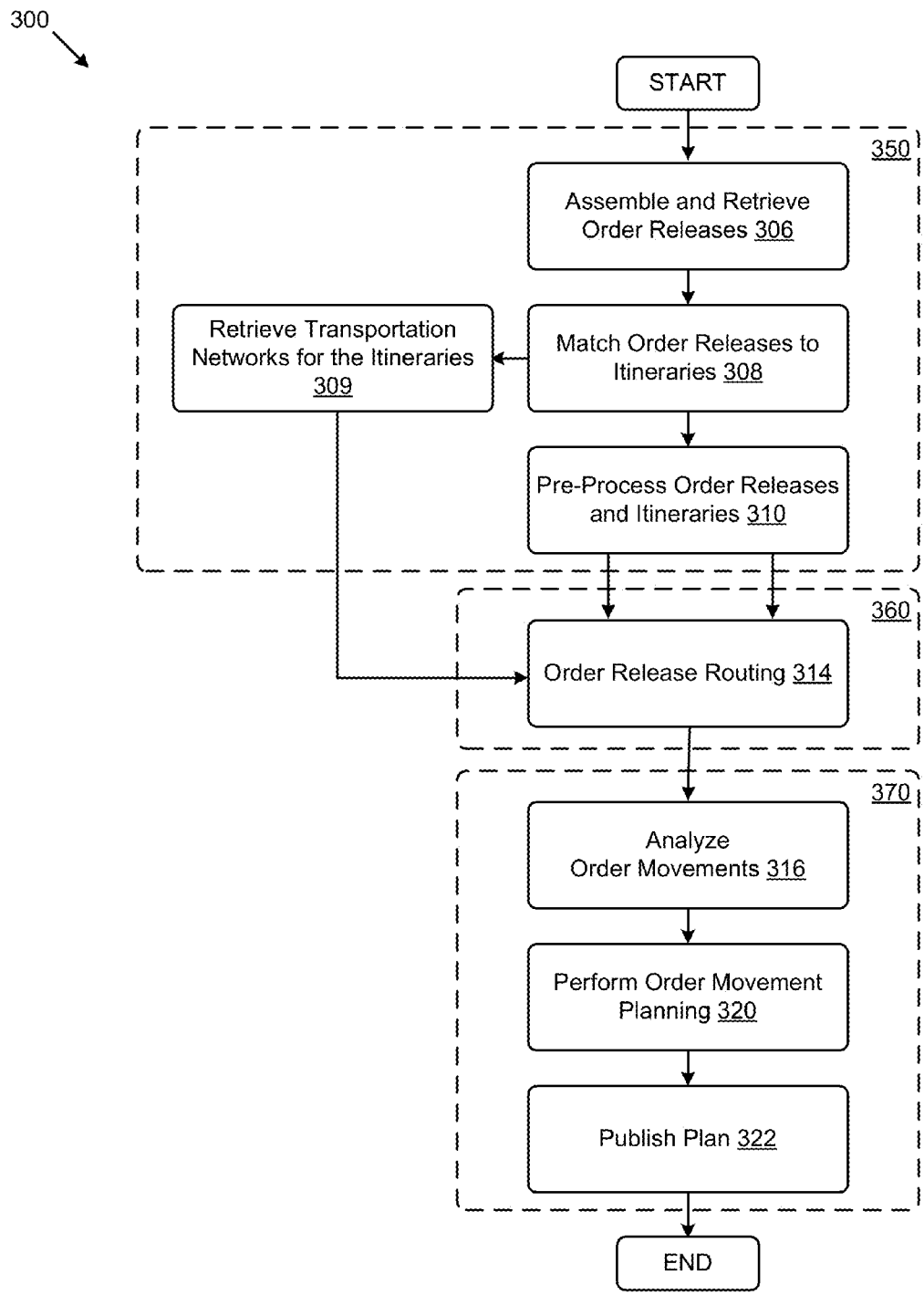
FIG. 3 is a schematic of an order management planning flow as used in systems for finding minimum cost transportation routes, according to some embodiments.

FIG. 3 is a schematic of an order management planning flow 300 as used in systems for finding minimum cost transportation routes. As an option, the present order management planning flow 300 may be implemented in the context of the architecture and functionality of the embodiments described herein. Also, the order management planning flow 300 or any aspect therein may be implemented in any desired environment.

Some or all of the techniques discussed in the foregoing FIG. 2A and FIG. 2B can be employed in an enterprise application and can become a part of an overall order management planning flow. As shown, a sequence of steps can collect and prepare data (see partition 350), and the pre-prepared/pre-processed data can become the subject of an order release operation (e.g., see operation 314 and partition 360). The results of an order release routing operation can become the subject of a set of operations for analysis and reporting (e.g., see partition 370). The partitions (e.g., partition 350, partition 360, and partition 370) are purely exemplary, and other partitions are reasonable and envisioned.

As shown, partition 350 commences with an operation to assemble and retrieve orders and to sequence or otherwise codify them into an order release data structure (see operation 306), then an operation within partition 350 serves to match order releases to itineraries (see operation 308). In this operation, each given order is matched to all of the active itineraries for which it qualifies (e.g., without violating any order constraints). Once order releases have been matched to itineraries, the matches can be pre-processed so as to present the matches in a format as expected by the order release routing algorithm (see operation 314). The order release routing algorithm receives a set of orders (e.g., orders that are matched to one or more itineraries) and enumerates a number of paths that the order can traverse while still meeting the timings and locations of the itineraries. Data structures in the form of order movements are generated for the paths. These order movements are used in subsequent steps (e.g., see order movement planning 320) and in publishing a plan (e.g., see operation 322). The generated order movements can be codified at an itinerary-leg level, or can refer to a network, or can be a network leg level.

Continuing, the order release routing algorithm executes (see partition 360). The order release routing operation receives inputs (see results of operation 310, and results of operation 309) which inputs are then used to find minimum cost transportation routes (e.g., using refined consolidation constraints obtained by pre-consolidating orders). The minimum cost transportation routes and other results can be analyzed and reported (see partition 370). For example, operations within partition 370 might serve to analyze order movements (see operation 316) and results of such analysis can be provided to operations for order movement planning (see order movement planning 320). For example, operations serving to perform order movement planning might include advising carriers of a schedule of goods to arrive at one of their facilities. In some cases, the flow of goods is managed by a person or organization whose function it is to oversee ongoing order release and movement of goods to the intended destinations. Accordingly a plan can be prepared and published in various human readable forms (e.g., a printed plan) or computer readable forms (see operation 322).

Now, the order release routing algorithm (see operation 314 and partition 360) can be implemented in a variety of ways without departing from the scope of the claims. Strictly as one example, the following figure presents and discusses one possible implementation of an order release routing flow.

Figure 4:
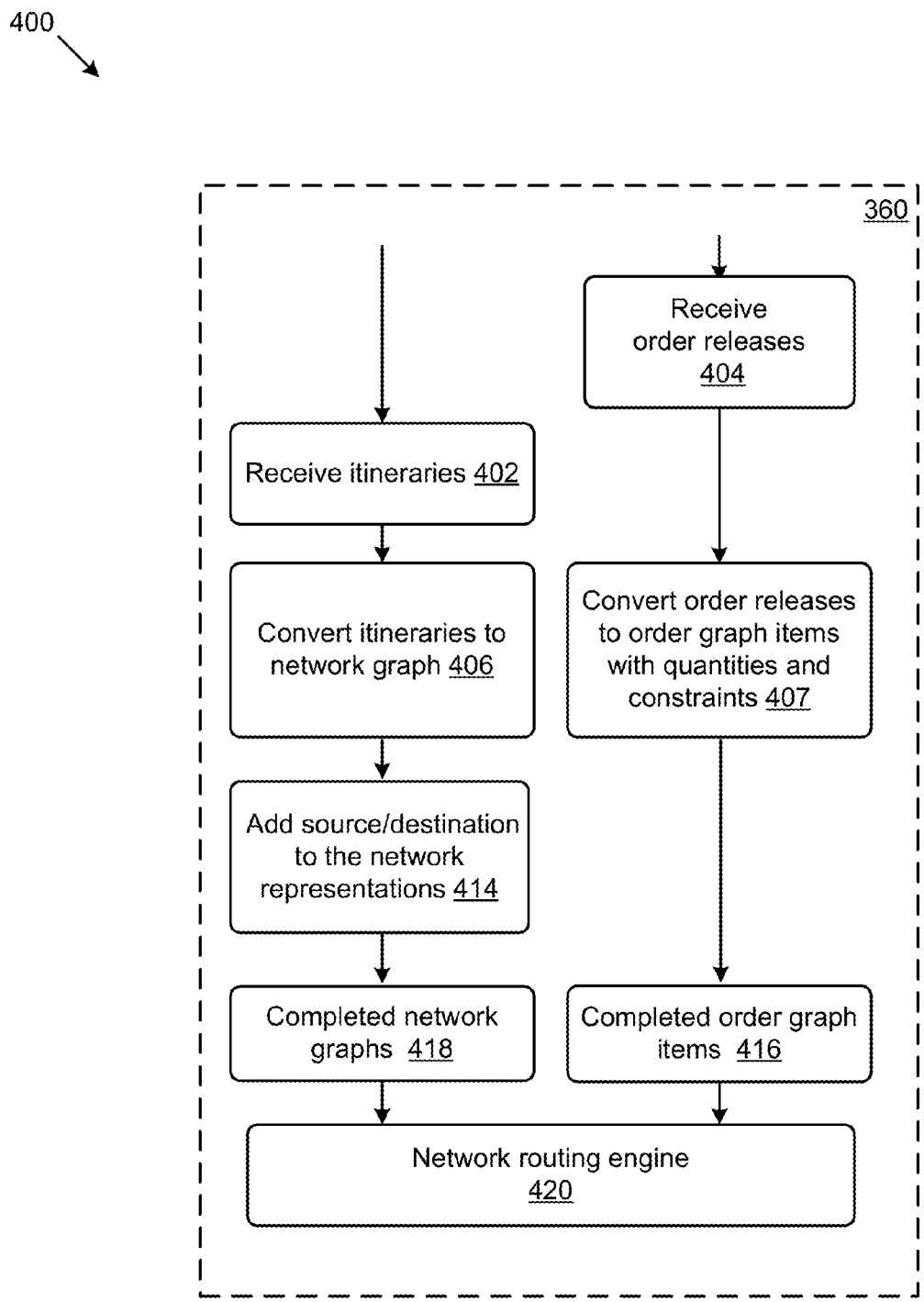
FIG. 4 is a schematic of an order release routing flow as used in systems for finding minimum cost transportation routes by consolidating orders onto feasible transportation legs, according to some embodiments.

FIG. 4 is a schematic of an order release routing flow 400 as used in systems for finding minimum cost transportation routes by consolidating orders onto feasible transportation legs. As an option, the present order release routing flow 400 may be implemented in the context of the architecture and functionality of the embodiments described herein. Also, the order release routing flow 400 or any aspect therein may be implemented in any desired environment.

As shown, FIG. 4 illustrates one embodiment for converting real-world user-defined itinerary and order data into the network representations suited for use by the network routing engine 420. The partition 360 receives itineraries (see operation 402) and order releases (see operation 404) as provided from the previously-discussed partition 350. The itineraries and order releases are transformed into (1) a network graph and (2) a set of order graph items, which data items describe a set of constraints (e.g., using mathematical and graphical constraint representations).

Strictly as an example within the context of this FIG. 4, itineraries are converted into a network graph of nodes and edges where the nodes represent locations, and the edges represent a means of traveling between the locations. The edges can be annotated so as to include user-defined constraints describing the costs and feasibility of such travel (see operation 406).

Order releases are converted into order graph items, which represent an abstracted form of the orders with respect to the network graph. An order graph item can include constraints such as source and destination nodes, constraints pertaining to quantity, and other constraints. The constraints, taken singly or as a whole, describe how (e.g., under what conditions) or whether (e.g., if a constraint is violated) an order graph item may use network graph edges (see operation 407).

Additional order-specific constraints, including source and destination and related distance and time-related data, can be abstracted from the order releases and added to the network graph (see operation 414).

These transformations produce the abovementioned network graph (see completed network graphs 418) and order graph items (see completed order graph items 416) in a format suited for use by the network routing engine 420.

The transformations can result in any of a variety of formats. As pertaining to the exemplary embodiment of FIG. 4, the formatted data as used by the algorithms in the network routing engine can include:
- location-related data;
- constraints representing whether and how travel among locations is feasible;
- abstracted costs, distances, and travel times associated with such locations;
- order source and destination locations;
- order quantities; and
- order constraints.

Network Solver Algorithm

Returning to the discussion of FIG. 1B, the operation to solve for optimal paths for each order (see operation 192) uses a network solver, and the network solver uses a set of constraints and an optimization function, both of which are discussed below.

The inputs to the algorithm comprise:
- A network representation. The representation defines the nodes and links for orders to flow through, and a set of orders with time windows, weight, volume, etc.
- Link descriptions: Each link in the network will contain the options for the flow.
- Resource Options: The options on a leg may specify a weight and volume capacity of a particular item of equipment (or other serially-reusable resource) in the network, a number of such resources, characterization of a cost per container (e.g., fixed cost, if applicable), and variable costs per unit quantity of resources used.

The algorithm performs the following numbered operations:

1. Determine k-shortest paths for each order. The number of paths (or routes) for each order can be a user definable parameter. As used in this paragraph, a shortest path is one that costs the least while satisfying all of the timing constraints on the order as well as on the leg options.

2. Using the k-shortest paths, those paths are used to formulate the multi-commodity network flow mixed integer programming (MIP). The linear programming (LP) relaxation solution provides some useful information on duals of orders and leg options. Within mathematical optimization theory, the dual information is derived from the dual perspective of the problem. Within a linear programming solution with resource constraints, the dual information can be seen as representing the value of a limited resource. Within the multi-commodity flow formulation, the leg options are represented as limited resources because a limited quantity of freight may be transported for a particular cost.

3. Using the dual information from previous steps, perform the k-shortest path algorithm to discover new paths for the orders. If new paths for the orders are discovered, go back to step 2 and solve the LP relaxation of the MIP problem again. Otherwise, go to step 4.

4. If no more new paths for the orders are added (or a maximum number of iterations have been exceeded) then again solve the mixed integer programming to optimality. The result of this step 4 is a path recommendation for each order. In addition to the paths, this step yields time information on the times for order movements.

Formal Treatment

TABLE 2

| Symbol | Description |
| --- | --- |
| $x_{ir}$ | Decision Variable - Binary: Represents if order i chooses route R (1: yes, 0: no). |
| $y_k$ | Decision Variable - Integer: Number of full containers in using the leg option k. |
| $z_k$ | Decision Variable - Real: Total flow in the last container (partial container). |
| $z_k^+$ | Decision Variable - Real: Total ratable flow in the last container (partial container). This is equal to $\text{Max}\{z_k, L_k\}$. In other words, if the flow in the partial container is less than the lower bound in the leg, it still gets charged for shipping L. |
| $\sigma_i$ | Decision Variable: 1 if an order is not on any route. |
| $c_k$ | Fixed cost of one container. |
| $d_k$ | Variable cost per unit quantity. |
| $p_i$ | Penalty for not routing an order: it might be proportional to priorities. |
| $d_k$ | Unit cost per measure in leg option k (measure can be cost per weight, cost per volume, etc.). |
| K | Set of all leg options. |
| R | Set of all routes. |
| $R_k$ | Set of all routes passing through leg option k. |
| $R_i$ | Set of all routes for order i. |

TABLE 2-continued

Symbols used in formulation

| Symbol | Description |
|---|---|
| $w_i$ | Weight of order i. |
| $U_k$ | Upper bound or weight capacity in the leg option k. |
| $L_k$ | Lower bound or weight capacity in the leg option k. |
| $v_i$ | Volume of order i. |
| $V_k$ | Volume capacity in the leg option k. |
| $e_i$ | Equipment reference unit (ERU) of order i. ERU is a quantity associated with order i with respect to a user-defined measure of equipment capacity. For example, an order quantity may be measured in the number of standard-sized pallets it takes up. |
| $E_k$ | ERU capacity in the leg option k. For example, ERU can refer to the capacity of the equipment type available on leg option k may be measured in the number of standard-sized pallets that can be loaded onto that equipment type. |
| $Capacity_g$ | Capacity in capacity group g. A capacity group is defined as a group of leg options for which capacity constraints are defined. |
| G | Set of all capacity groups. |
| $K_g$ | Set of all leg options that belong to capacity group g. |
| H | Set of all commitment groups. |
| S | Set of all service providers. |
| $Commit_{hs}$ | Commitment (in decimal, e.g., 0.9 means 90%) in group h for service provider s. |
| $Served_{hs}$ | Number of shipments already served for the service provider s in the group h. |
| $Served_h$ | Number of shipments already served in the commit group h. |
| $K_h$ | Set of all leg options that belong to commit group h. |
| $K_{hs}$ | Set of all leg options that belong to commit group h and served by service provider s. |
| $Total_h$ | Decision Variable: Total number of shipments served in the group h. |
| $Served_h$ | Number of shipments already served in the commit group h. |

TABLE 3

Mathematical formulation

| Formulation | Eq. # |
|---|---|
| Minimize $\sum_{k \in K} (c_k y_k + d_k z_k^+) + \text{Penalty} \sum_{h \in H, s \in S} cs_{hs} + \sum_{i \in I} p_i \sigma_i$ | (0) |
| Subject To: | |
| $\sum_{r \in R_i} x_{ir} + \sigma_i = 1 \quad \forall i \in I$ | (1) |
| $\sum_{i \in I} \sum_{r \in R_k} (x_{ir} w_i) = U_k y_k + z_k \quad \forall k \in K$ | (2) |
| $z_k^+ \geq z_k \quad \forall k \in K$ | (3) |
| $\sum_{i \in I} \sum_{r \in R_k} (x_{ir} v_i) \leq y_k V_k \quad \forall k \in K$ | (4) |
| $\sum_{i \in I} \sum_{r \in R_k} (x_{ir} e_i) \leq y_k E_k \quad \forall k \in K$ | (5) |
| $\sum_{k \in K_g} y_k + Served_g \leq Capacity_g \quad \forall g \in G$ | (6) |
| $\sum_{k \in K_h} y_k + Served_h = total_h \quad \forall h \in H$ | (7) |

TABLE 3-continued

Mathematical formulation

| Formulation | Eq. # |
|---|---|
| $\sum_{k \in K_{hs}} y_k + Served_{hs} - cs_{hs} = commit_{hs} total_h \quad \forall h \in H, \forall s \in S$ | (8) |
| $x_{ir} = (0, 1); \ 0 \leq z_k \leq U_k, \ z_k^+ \geq L_k; \ y_k \geq 0$ and Integer | (9) |

Description of the Objective Function

The objective function is defined so as to minimize the total cost of transportation. The term $c_k y_k$ refers to the fixed costs of all full containers and the term $d_k z_k^+$, refers to a total variable cost of the flow in the corresponding leg. The total cost is the cost of all full containers (e.g., trailer, refrigeration container, other container, etc.) and partial container loads on all the leg options. The objective function also considers penalties such as a penalty for not meeting carrier commitments, a penalty for not routing the high priority orders, etc.

Description of Constraints

The constraint of EQ. 1 ensures that each order is put on a route. If an order is not on any route, a penalty is applied. The variable $\sigma_i$ indicates whether a particular order i is put on a route.

The constraints of EQ. 2 determine the number of full (e.g., utilized to capacity) equipment resources $y_k$ needed in equipment option k. The variable $z_k$ represents the amount of flow that is sent via any partial containers.

The constraints of EQ. 3 determine the amount used in the last container (e.g., a partial container). This amount is stored in the variable $z_k$. If the flow is less than the lower bound allowed in the leg, then the cost equal to the lower bound's cost will be applied.

The constraint of EQ. 4 ensures that there is enough volume in the containers to hold all of the orders flowing through the leg option.

The constraint of EQ. 5 ensures that there is enough capacity to hold all of the orders in the containers.

The constraint of EQ. 6 serves to handle carrier capacity constraints.

The constraints of EQ. 7 and EQ. 8 handle commitments.

The constraints of EQ. 9 handles constraints related to the range of values allowed for the decision variables. For example, an order must either choose or not choose a particular route. Or, for another example, the number of full containers chosen for a leg option must be a non-negative integer, and the total flow within a partial container must not be greater than the capacity of that container.

The above constraints, variables, constants, functions, and tests can be entered by a user, possibly using a graphical user interface or other screen device, which is presently discussed.

FIG. 5 is a sample screen device 500 for entering multimode transportation network optimizer characteristics. As an option, the present screen device 500 may be implemented in the context of the architecture and functionality of the embodiments described herein. Also, the screen device 500 or any aspect therein may be implemented in any desired environment.

As shown, using any known-in-the-art technique, a user can enter values corresponding to the shown variables. In particular, the heretofore discussed constraints, variables, constants, functions, and tests as may be used in optimization can be entered using the entry fields 510.

Additional Embodiments of the Disclosure

Figure 6:
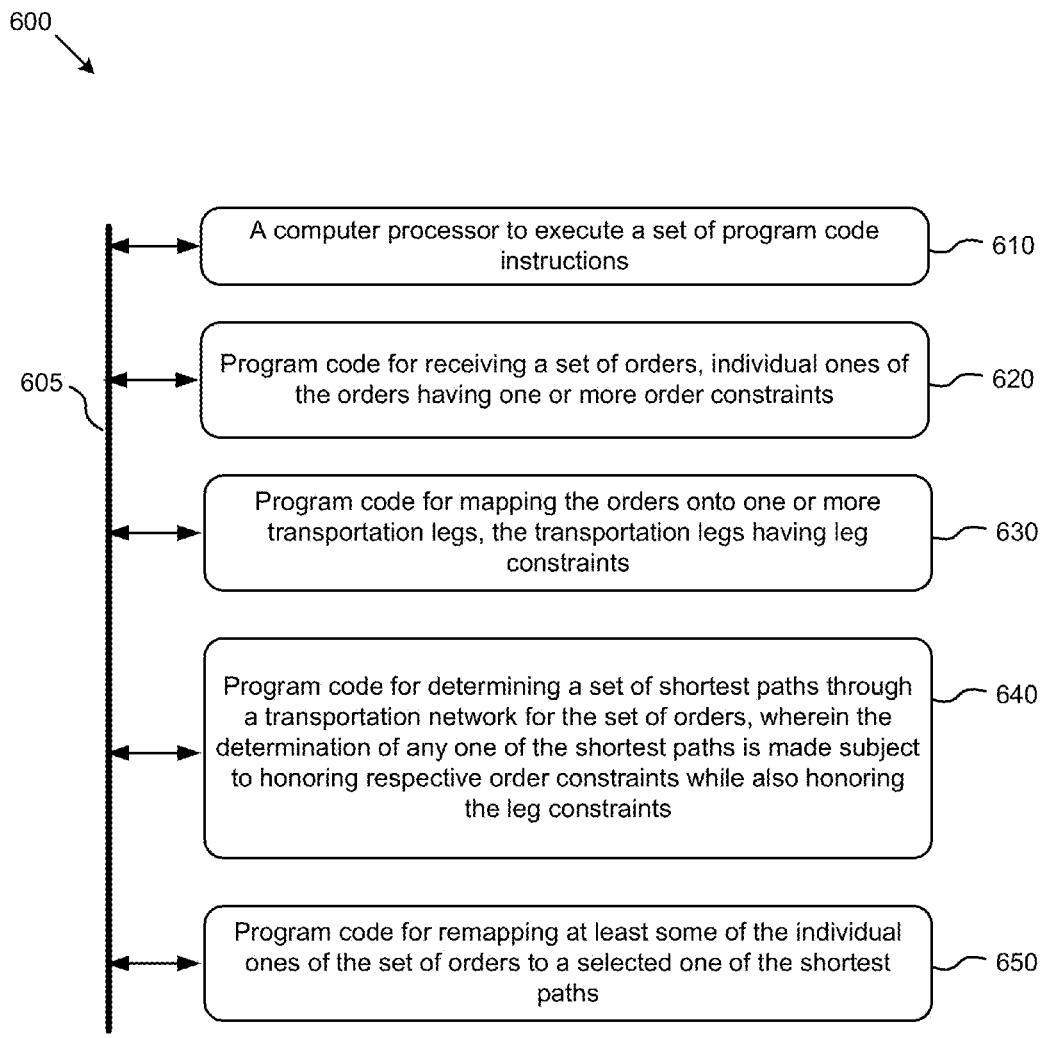
FIG. 6 is a block diagram of a flow for finding minimum cost transportation routes by using refined consolidation constraints, according to some embodiments.

FIG. 6 is a block diagram of a flow 600 for finding minimum cost transportation routes using refined consolidation constraints. As an option, the present system 600 may be implemented in the context of the architecture and functionality of the embodiments described herein. Of course, however, the system 600 or any operation therein may be carried out in any desired environment.

As shown, system 600 comprises a computer processor to execute a set of program code instructions (see module 610), a communication path 605, and modules for accessing memory to hold program code instructions to perform: receiving a set of orders, the orders having one or more order constraints (see module 620); mapping the orders onto one or more transportation legs, the transportation legs having leg constraints (see module 630); determining a set of shortest paths through a transportation network for the set of orders, wherein the determination of any one of the shortest paths is made subject to honoring respective order constraints while also honoring the leg constraints (see module 640); and remapping at least some of the individual ones of the set of orders to a selected one of the shortest paths (see module 650).

Some embodiments include processing wherein at least one of the honored order constraints comprises a content characteristic (e.g., nature or type of contents) of the order, and/or a source location of the order and/or a destination location for the order.

Figure 7:
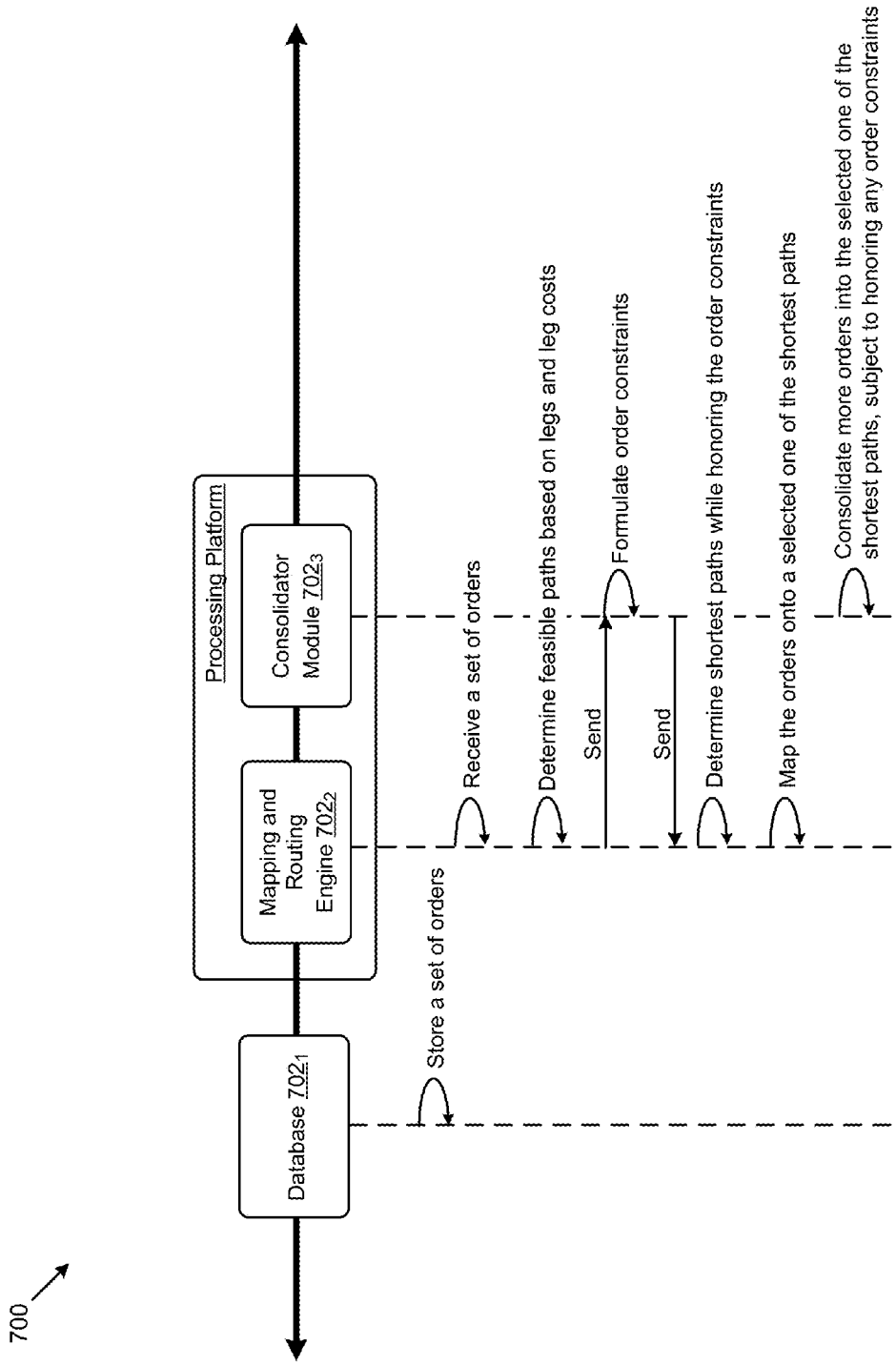
FIG. 7 is a block diagram of a system for finding minimum cost transportation, according to some embodiments.

FIG. 7 is a block diagram of a system for finding minimum cost transportation routes. As an option, the present system 700 may be implemented in the context of the architecture and functionality of the embodiments described herein. Of course, however, the system 700 or any operation therein may be carried out in any desired environment.

The system 700 comprises a database $702_1$ and a processing platform. The processing platform comprises a mapping and routing engine $702_2$, and a consolidator module $702_3$. The database holds a set of orders to be retrieved on demand. In exemplary operation, a routing engine (e.g., a mapping and routing engine $702_2$) is configured to receive a set of orders, the orders having one or more order constraints. A consolidator (e.g., consolidator module $702_3$) is used to consolidate the orders onto one or more transportation legs wherein the transportation legs have leg constraints. In this embodiment, the feasible paths are determined by the mapping and routing engine. Order constraints are formulated for consideration in another mapping and routing operation. Then, a routing engine solver (e.g., mapping and routing engine $702_2$) determines a set of shortest paths through a transportation network for the set of orders subject to honoring the order constraints). One of the shortest paths is selected, and still more orders can be mapped to the selected shortest path, subject to honoring the order constraints. In this embodiment, a consolidator module serves to add more orders to the selected one of shortest paths.

Figure 8:
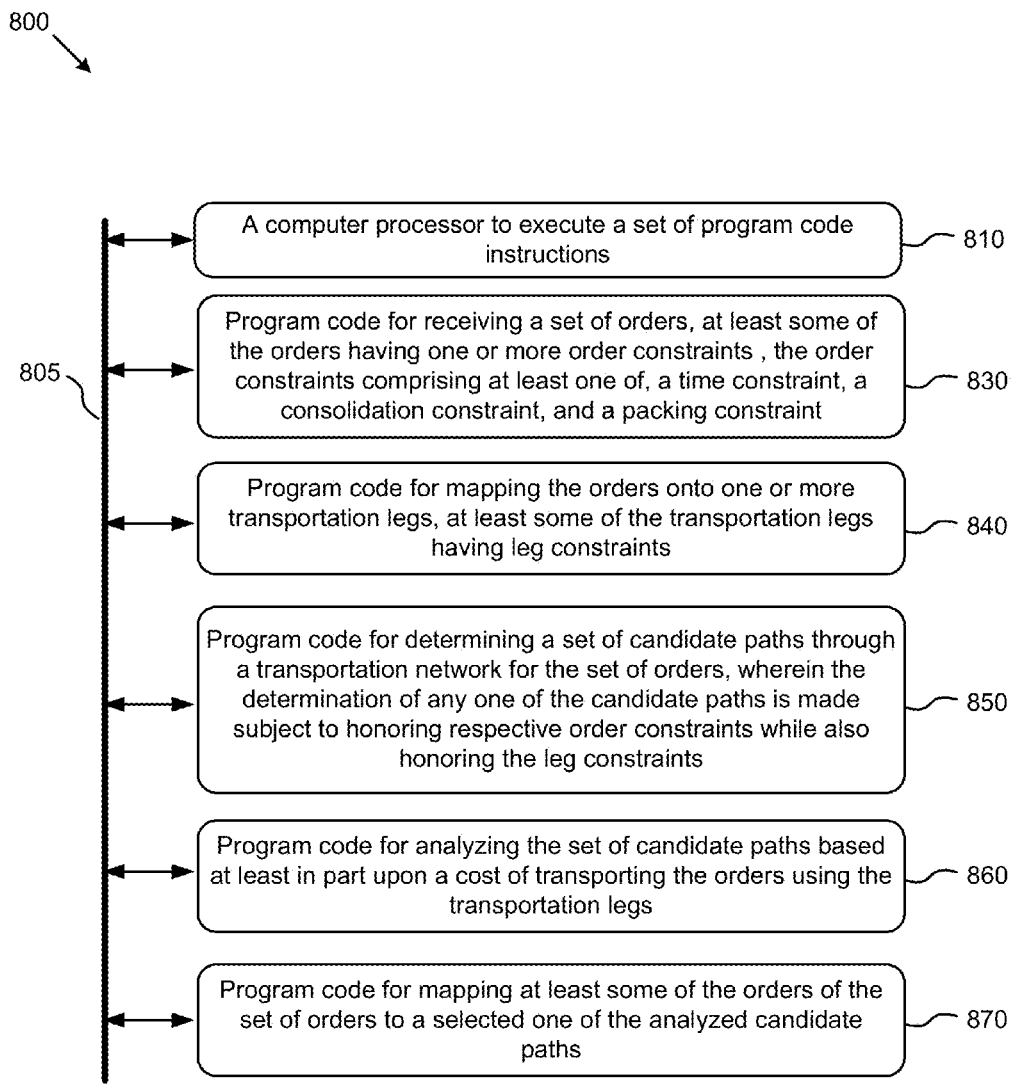
FIG. 8 is a block diagram of a system for finding minimum cost transportation, according to some embodiments.

FIG. 8 is a block diagram of a system for finding minimum cost transportation routes. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: receiving a set of orders, at least some of the orders having one or more order constraints, the order constraints comprising at least one of, a time constraint, a consolidation constraint, and a packing constraint (see module 830); mapping the orders onto one or more transportation legs, at least some of the transportation legs having leg constraints (see module 840); determining a set of candidate paths through a transportation network for the set of orders, wherein the determination of any one of the candidate paths is made subject to honoring respective order constraints while also honoring the leg constraints (see module 850); analyzing the set of candidate paths based at least in part upon a cost of transporting the orders using the transportation legs (see module 860); and mapping at least some of the orders of the set of orders to a selected one of the analyzed candidate paths (see module 870).

System Architecture Overview

Figure 9:
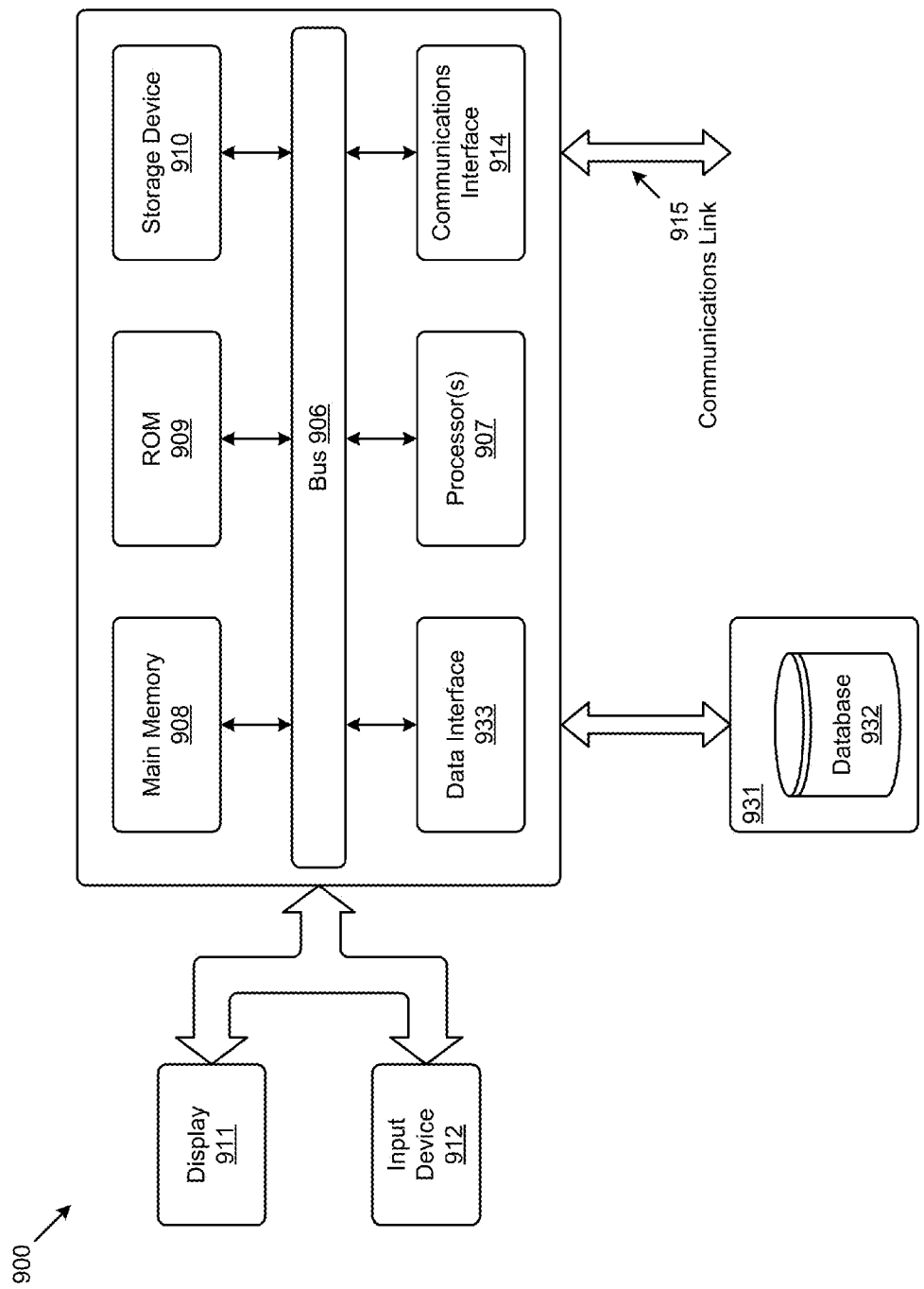
FIG. 9 depicts a block diagram of an instance of a computer system suitable for implementing an embodiment of the present disclosure.

FIG. 9 depicts a block diagram of an instance of a computer system 900 suitable for implementing an embodiment of the present disclosure. Computer system 900 includes a bus 906 or other communication mechanism for communicating information, which interconnects subsystems and devices, such as a processor 907, a system memory 908 (e.g., RAM), a static storage device (e.g., ROM 909), a disk drive 910 (e.g., magnetic or optical), a data interface 933, a communication interface 914 (e.g., modem or Ethernet card), a display 911 (e.g., CRT or LCD), input devices 912 (e.g., keyboard, cursor control), and an external data repository 931.

According to one embodiment of the disclosure, computer system 900 performs specific operations by processor 907 executing one or more sequences of one or more instructions contained in system memory 908. Such instructions may be read into system memory 908 from another computer readable/usable medium, such as a static storage device or a disk drive 910. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms, including but not limited to, non-volatile media and volatile media. Non-volatile media includes, for example, optical or magnetic disks, such as disk drive 910. Volatile media includes dynamic memory, such as system memory 908.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 900. According to certain embodiments of the disclosure, two or more computer systems 900 coupled by a communications link 915 (e.g., LAN, PTSN, or wireless network) may perform the sequence of instructions required to practice the disclosure in coordination with one another.

Computer system 900 may transmit and receive messages, data, and instructions, including programs (e.g., application code), through communications link 915 and communication interface 914. Received program code may be executed by processor 907 as it is received, and/or stored in disk drive 910 or other non-volatile storage for later execution. Computer system 900 may communicate through a data interface 933 to a database 932 on an external data repository 931. A module as used herein can be implemented using any mix of any portions of the system memory 908, and any extent of hard-wired circuitry including hard-wired circuitry embodied as a processor 907.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method comprising:
using a computing system having at least one processor to perform a process, the process comprising:
receiving a graph of nodes and edges where the nodes represent locations and the edges represent travel between locations, wherein the edges are annotated with edge constraints describing parameters regarding travel between locations;
receiving a set of orders;
converting the set of orders into a set of graph items in a format suitable for processing by a mapping engine, the graph items including at least a source node and destination node, the graph items having one or more order constraints comprising a first type of constraints that are inherent in data corresponding to the set of orders and a second type of constraints that are derived from the data corresponding to the set of orders, the first type of constraints comprising at least one of, a time constraint, a consolidation constraint, and a packing constraint;
mapping the graph items onto one or more transportation legs using the mapping engine, the one or more transportation legs comprising a plurality of locations represented by nodes and one or more edges, the graph items mapped to the one or more transportations legs satisfy the edge constraints for the one or more transportation legs and the order constraints for the graph items comprising inherent constraints and derived constraints;
generating a set of candidate paths between respective source nodes and respective destination nodes for at least a subset of the set of graph items, wherein the generation of any one of the candidate paths of the set of candidate paths is made subject to honoring respective order constraints comprising inherent constraints, derived constraints, leg constraints, and constraints for combinations of candidate paths and subsets of the subset of the set of graph items; and
assigning at least some orders of the set of orders to a selected one of the candidate paths using the graph items and the graph of nodes and edges of the selected one of the candidate paths.

2. The method of claim 1, further comprising:
receiving a set of additional orders, at least some of the set of additional orders having at least one respective order constraint; and
mapping at least some orders of the set of additional orders to a selected one of the candidate paths subject to honoring respective order constraints.

3. The method of claim 1, wherein at least one of the order constraints comprises a content characteristic of a respective order.

4. The method of claim 1, wherein at least one of the order constraints comprises a source location.

5. The method of claim 1, wherein at least one of the order constraints comprises a destination location.

6. The method of claim 1, further comprising honoring a carrier capacity constraint.

7. The method of claim 1, wherein analyzing the set of candidate paths uses a linear programming network solver.

8. The method of claim 1,
further comprising:
receiving a set of additional orders, at least some of the set of additional orders having at least one respective order constraint,
mapping at least some orders of the set of additional orders to a selected one of the candidate paths subject to honoring respective order constraints, and
ordering the candidate paths by a sum of costs associated with each leg; and
wherein:
the order constraints comprise timing constraints, rate constraints, route constraints, quantity constraints, must travers constraints, must avoid constraints, weight constraints, volume constraints, geography constraints, content characteristic constraints, source location constraint, and destination location constraint,
the leg constraints comprise load or capacity constraints, carrier constraints, equipment capacity constraints, rate constraints, weight constraints, and volume constraints,
the derived constraints correspond to at least constraints specifying when orders must be shipped together and when orders must be shipped separately,
at least some of the constraints are entered by a user using a graphical user interface,
mapping comprises at least enumerating a number of paths that respective orders can traverse while still satisfying timings and locations of itineraries, and mapping includes sequencing of pickup and delivery stop constraints,
the generation of any one of the candidate paths of the set of candidate paths is made subject to honoring respective order constraints corresponds to only generating feasible candidate paths, generating comprises the set of candidate paths comprises groupings of respective orders that satisfy the respective order constraints and travers a plurality of legs, the generation of candidate paths is subject to an iteration limit that is user definable,
at least some of the candidate paths correspond to multiple orders and correspond to multiple different transportation modes and carriers, wherein transportation modes comprise at least land, air, and sea
analyzing the set of candidate paths uses a linear programming network solver.

9. The method of claim 1, wherein mapping includes sequencing of pickup and delivery stop constraints.

10. A computer program product embodied in a non-transitory computer readable medium, the computer readable medium having stored thereon a sequence of instructions which, when executed by a processor causes the processor to execute a process to implement finding minimum cost transportation routes by consolidating orders under relaxed constraints, the process comprising:
receiving a graph of nodes and edges where the nodes represent locations and the edges represent travel between locations, wherein the edges are annotated with edge constraints describing parameters regarding travel between locations;
receiving a set of orders;
converting the set of orders into a set of graph items in a format suitable for processing by a mapping engine, the graph items including at least a source node and destination node, the graph items having one or more order constraints comprising a first type of constraints that are inherent in data corresponding to the set of orders and a second type of constraints that are derived from the data corresponding to the set of orders, the first type of constraints comprising at least one of, a time constraint, a consolidation constraint, and a packing constraint;
mapping the graph items onto one or more transportation legs using the mapping engine, the one or more transportation legs comprising a plurality of locations represented by nodes and one or more edges, the graph items mapped to the one or more transportations legs satisfy the edge constraints for the one or more transportation legs and the order constraints for the graph items comprising inherent constraints and derived constraints;
generating a set of candidate paths between respective source nodes and respective destination nodes for at least a subset of the set of graph items, wherein the generation of any one of the candidate paths of the set of candidate paths is made subject to honoring respective order constraints comprising inherent constraints, derived constraints, leg constraints, and constraints for combinations of candidate paths and subsets of the subset of the set of graph items; and
assigning at least some orders of the set of orders to a selected one of the candidate paths using the graph items and the graph of nodes and edges of the selected one of the candidate paths.

11. The computer program product of claim 10, further comprising instructions for:
receiving a set of additional orders, at least some of the set of additional orders having at least one respective order constraint; and
mapping at least some orders of the set of additional orders to a selected one of the candidate paths subject to honoring respective order constraints.

12. The computer program product of claim 10, wherein at least one of the order constraints comprises a content characteristic of a respective order.

13. The computer program product of claim 10, wherein at least one of the order constraints comprises a source location.

14. The computer program product of claim 10, wherein at least one of the order constraints comprises a destination location.

15. The computer program product of claim 10, further comprising instructions for honoring a carrier capacity constraint.

16. The computer program product of claim 10, wherein analyzing the set of candidate paths uses a linear programming network solver.

17. The computer program product of claim 10,
further comprising instructions for:
receiving a set of additional orders, at least some of the set of additional orders having at least one respective order constraint,
mapping at least some orders of the set of additional orders to a selected one of the candidate paths subject to honoring respective order constraints, and
ordering the candidate paths by a sum of costs associated with each leg; and
wherein:
the order constraints comprise timing constraints, rate constraints, route constraints, quantity constraints, must travers constraints, must avoid constraints, weight constraints, volume constraints, geography constraints, content characteristic constraints, source location constraint, and destination location constraint, the leg constraints comprise load or capacity constraints, carrier constraints, equipment capacity constraints, rate constraints, weight constraints, and volume constraints, the derived constraints correspond to at least constraints specifying when orders must be shipped together and when orders must be shipped separately, at least some of the constraints are entered by a user using a graphical user interface, mapping comprises at least enumerating a number of paths that respective orders can traverse while still satisfying timings and locations of itineraries, and mapping includes sequencing of pickup and delivery stop constraints, the generation of any one of the candidate paths of the set of candidate paths is made subject to honoring respective order constraints corresponds to only generating feasible candidate paths, generating comprises the set of candidate paths comprises groupings of respective orders that satisfy the respective order constraints and travers a plurality of legs, the generation of candidate paths is subject to an iteration limit that is user definable, at least some of the candidate paths correspond to multiple orders and correspond to multiple different transportation modes and carriers, wherein transportation modes comprise at least land, air, and sea analyzing the set of candidate paths uses a linear programming network solver.

18. The computer program product of claim 10, wherein mapping includes sequencing of pickup and delivery stop constraints.

19. A computer system comprising:
a memory for storing instructions; and
a processor which performs the following actions when executing instructions:
  receiving a graph of nodes and edges where the nodes represent locations and the edges represent travel between locations, wherein the edges are annotated with edge constraints describing parameters regarding travel between locations;
  receiving a set of orders;
  converting the set of orders into a set of graph items in a format suitable for processing by a mapping engine, the graph items including at least a source node and destination node, the graph items having one or more order constraints comprising a first type of constraints that are inherent in data corresponding to the set of orders and a second type of constraints that are derived from the data corresponding to the set of orders, the first type of constraints comprising at least one of, a time constraint, a consolidation constraint, and a packing constraint;
  mapping the graph items onto one or more transportation legs using the mapping engine, the one or more transportation legs comprising a plurality of locations represented by nodes and one or more edges, the graph items mapped to the one or more transportations legs satisfy the edge constraints for the one or more transportation legs and the order constraints for the graph items comprising inherent constraints and derived constraints;
  generating a set of candidate paths between respective source nodes and respective destination nodes for at least a subset of the set of graph items, wherein the generation of any one of the candidate paths of the set of candidate paths is made subject to honoring respective order constraints comprising inherent constraints, derived constraints, leg constraints, and constraints for combinations of candidate paths and subsets of the subset of the set of graph items; and
  assigning at least some orders of the set of orders to a selected one of the candidate paths using the graph items and the graph of nodes and edges of the selected one of the candidate paths.

20. The computer system of claim 19,
the actions further comprising:
  receiving a set of additional orders, at least some of the set of additional orders having at least one respective order constraint,
  mapping at least some orders of the set of additional orders to a selected one of the candidate paths subject to honoring respective order constraints, and
  ordering the candidate paths by a sum of costs associated with each leg; and
wherein:
  the order constraints comprise timing constraints, rate constraints, route constraints, quantity constraints, must travers constraints, must avoid constraints, weight constraints, volume constraints, geography constraints, content characteristic constraints, source location constraint, and destination location constraint,
  the leg constraints comprise load or capacity constraints, carrier constraints, equipment capacity constraints, rate constraints, weight constraints, and volume constraints,
  the derived constraints correspond to at least constraints specifying when orders must be shipped together and when orders must be shipped separately,
  at least some of the constraints are entered by a user using a graphical user interface,
  mapping comprises at least enumerating a number of paths that respective orders can traverse while still satisfying timings and locations of itineraries, and mapping includes sequencing of pickup and delivery stop constraints,
  the generation of any one of the candidate paths of the set of candidate paths is made subject to honoring respective order constraints corresponds to only generating feasible candidate paths, generating comprises the set of candidate paths comprises groupings of respective orders that satisfy the respective order constraints and travers a plurality of legs, the generation of candidate paths is subject to an iteration limit that is user definable,
  at least some of the candidate paths correspond to multiple orders and correspond to multiple different transportation modes and carriers, wherein transportation modes comprise at least land, air, and sea
  analyzing the set of candidate paths uses a linear programming network solver.

* * * * *

UNITED STATES PATENT AND TRADEMARK OFFICE
CERTIFICATE OF CORRECTION

PATENT NO. : 10,007,889 B2  
APPLICATION NO. : 14/107814  
DATED : June 26, 2018  
INVENTOR(S) : Arunapuram et al.

Page 1 of 1

It is certified that error appears in the above-identified patent and that said Letters Patent is hereby corrected as shown below:

In the Drawings

On sheet 9 of 10, in FIG. 8, under Reference Numeral 830, Line 2, Delete "constraints ," and insert -- constraints, --, therefor.

Signed and Sealed this  
Second Day of April, 2019

Andrei Iancu  
*Director of the United States Patent and Trademark Office*